United States Patent
Jiang et al.

(10) Patent No.: US 10,001,849 B2
(45) Date of Patent: Jun. 19, 2018

(54) TOUCH PANEL

(71) Applicant: TPK Touch Solutions (Xiamen) Inc., Xiamen (CN)

(72) Inventors: Yau-Chen Jiang, Hsinchu (TW); Bin Lai, Fuzhou (CN); Defa Wu, Jinjiang (CN); Jianbin Yan, Putian (CN); Liangzhen Xu, Xiamen (CN); Yu Zhang, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 158 days.

(21) Appl. No.: 14/946,753

(22) Filed: Nov. 19, 2015

(65) Prior Publication Data

US 2016/0154527 A1 Jun. 2, 2016

(30) Foreign Application Priority Data

Dec. 1, 2014 (CN) .......................... 2014 1 0718261

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01)

(58) Field of Classification Search
CPC ........ G06F 3/041; G06F 3/0412; G06F 3/044; G06F 2203/04103; G06F 2203/04111; G06F 2203/04112
See application file for complete search history.

(56) References Cited

U.S. PATENT DOCUMENTS

| | | | | |
|---|---|---|---|---|
| 2012/0006585 A1* | 1/2012 | Chikahisa | ............... | G06F 3/045 174/257 |
| 2013/0082961 A1* | 4/2013 | Wang | ....................... | G06F 3/044 345/173 |
| 2014/0063361 A1* | 3/2014 | Lo | ............................. | G06F 1/16 349/12 |
| 2014/0184941 A1* | 7/2014 | Lee | ........................ | G06F 3/041 349/12 |
| 2014/0300835 A1* | 10/2014 | Chu | ....................... | G06F 3/044 349/12 |
| 2014/0347577 A1* | 11/2014 | Chen | ....................... | G06F 3/044 349/12 |
| 2014/0367242 A1* | 12/2014 | Chen | ....................... | G06F 3/041 200/600 |

\* cited by examiner

*Primary Examiner* — Nathan Danielsen
(74) *Attorney, Agent, or Firm* — Cooper Legal Group, LLC (57) ABSTRACT

A touch panel comprises a substrate, a first mask structure and a dense structure. The first mask structure is disposed on a surface of the substrate and divides the substrate into a mask area and a visible area disposed adjacent to the mask area. The first mask structure is disposed in the mask area. The dense structure at least masks a surface of the first mask structure farther from the substrate.

10 Claims, 9 Drawing Sheets

TOUCH PANEL

This Non-provisional application claims priority under 35 U.S.C. § 119(a) on Patent Application No(s). 201410718261.7 filed in People's Republic of China on Dec. 1, 2014, the entire contents of which are hereby incorporated by reference.

BACKGROUND OF THE INVENTION

Technical Field

This disclosure relates to a touch panel.

Related Art

In current touch technology, a circuit is generally disposed at a periphery of a sensing area of a touch panel and touch signals can be transmitted to a related processing circuit through the circuit for processing. Furthermore, for aesthetic reasons, a mask structure, such as ink or photoresist material, is generally disposed at a portion of the touch panel opposite to the circuit for masking the circuit, so that the area having the mask structure (mask area), the so-called border area, is formed.

In general, the border area is mainly black, masking the circuit by the low transmittance property of the black ink or the photoresist material. However, when the mask structure is formed by the material of other colors, especially the material of light color (such as white ink), in the border area, the mask structure will be easily changed in color due to the influence of the temperature, oxygen or chemical liquids in the subsequent process since the mask structure is more sensitive to the temperature (for example, the white ink will be yellowed), and, the appearance of the product will be affected.

SUMMARY OF THE INVENTION

In view of the foregoing subject, this disclosure provides a touch panel whereby the mask structure in the mask area can be prevented from being changed in color.

A touch panel according to the disclosure comprises a substrate, a first mask structure and a dense structure. The first mask structure is disposed on a surface of the substrate and divides the substrate into a mask area and a visible area disposed adjacent to the mask area. The first mask structure is disposed in the mask area. The dense structure at least masks a surface of the first mask structure farther from the substrate.

In some embodiments, the dense structure further masks a lateral face of the first mask structure.

In some embodiments, the dense structure is extended to the surface of the substrate along the lateral face of the first mask structure closer to the visible area.

In some embodiments, the dense structure is extended to the surface of the substrate along the lateral face of the first mask structure farther from the visible area.

In some embodiments, the dense structure is made of a transparent insulating material and further masks the visible area.

In some embodiments, the touch panel further comprises a touch sensing structure comprising an electrode structure and a plurality of wires. The electrode structure is disposed on the surface of the substrate where the first mask structure is formed, is located in the visible area and is partially extended to the dense structure in the mask area. The wires are disposed on the dense structure and located in the mask area and electrically connected with the electrode structure.

In some embodiments, the touch panel further comprises a touch sensing structure comprising an electrode structure and a plurality of wires. The electrode structure is disposed on the surface of the substrate where the first mask structure is formed and located in the visible area. The wires are disposed on the dense structure, are partially extended to the visible area and are electrically connected with the electrode structure.

In some embodiments, the touch panel further comprises a second mask structure, which is disposed between the dense structure and the wires and located in the mask area.

In some embodiments, the touch panel further comprises a protection layer, which is disposed on a side of the touch sensing structure farther from the second mask structure and located in the mask area and at least masks the wires and the second mask structure.

In some embodiments, the first mask structure comprises a first mask layer and a second mask layer. The first mask layer is disposed on the substrate. The second mask layer is disposed on the first mask layer and between the dense structure and the first mask layer.

In some embodiments, the area of the second mask layer is less than that of the first mask layer, and the ends of the second mask layer and the first mask layer closer to the visible area form a stair-like structure.

In some embodiments, the area of the first mask layer is less than that of the second mask layer, and the second mask layer is extended to the substrate along a lateral face of the first mask layer closer to the visible area.

In some embodiments, at least a third mask layer is disposed between the second mask layer and the first mask layer.

In some embodiments, the material of the first mask structure is the opaque non-black insulating material.

In some embodiments, the material of the first mask structure is the white ink material.

In some embodiments, the dense degree of the dense structure is larger than or equal to about 0.74.

In some embodiments, the dense structure is a transparent layer.

In some embodiments, the material of the dense structure is transparent $SiO_2$, $SiON$, or the mixture of $SiO_2$ and $Nb_2O_5$.

In some embodiments, the materials of the second mask structure and the protection layer comprise black ink material or black photoresist material.

As mentioned above, in the touch panel of this disclosure, the dense structure masks the first mask structure and has a higher dense degree and a capability to resist high temperature. Therefore, the first mask structure, is protected, so that the deterioration and the color change of the first mask structure in the mask area can be avoided. Thereby, the appearance of the touch panel looks better.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE INVENTION

The present disclosure will be apparent from the following detailed description, which proceeds with reference to the accompanying drawings, wherein the same references relate to the same elements.

Figure 1A:
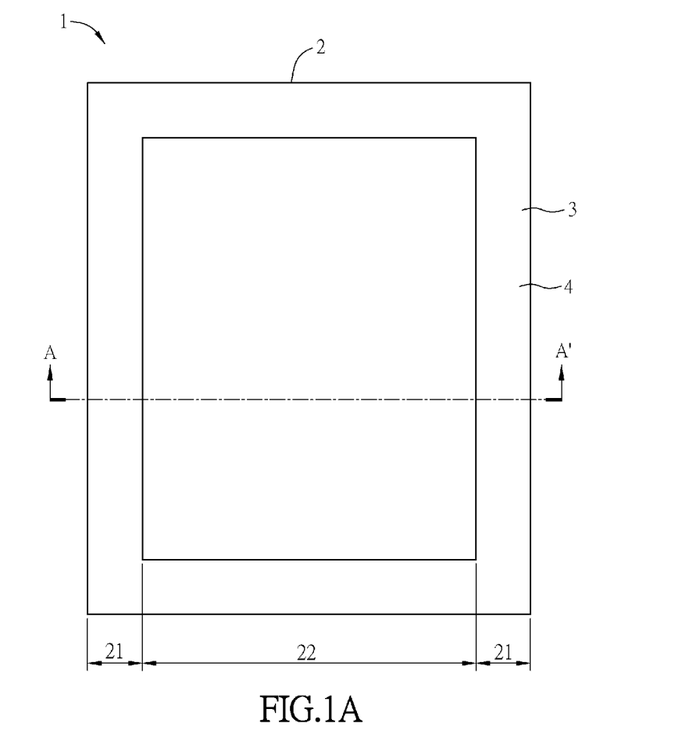
FIG. 1A is a schematic top-view diagram of a touch panel of some embodiments of the disclosure.
Figure 1B:
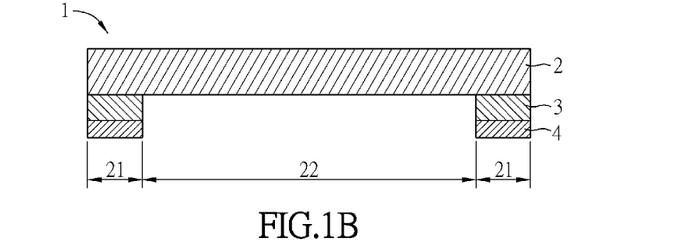
FIG. 1B is a schematic sectional diagram of FIG. 1A taken along the line A-A'.

FIG. 1A is a schematic top-view diagram of a touch panel 1 of some embodiments of the disclosure, and FIG. 1B is a schematic sectional diagram of FIG. 1A taken along the line A-A'. As shown in FIGS. 1A and 1B, the touch panel 1 includes a substrate 2, a first mask structure 3 and a dense structure 4. The first mask structure 3 is disposed on a surface of the substrate 2 to divide the substrate 2 into a mask area 21 and a visible area 22 disposed adjacent to the mask area 21. The mask area 21 is disposed corresponding to the first mask structure 3. In some embodiments, the mask area 21 is disposed around the visible area 22. In other embodiments, the mask area 21 may be disposed on at least one side of the visible area 22. The dense structure 4 is disposed on the first mask structure 3 and at least masks the surface of the first mask structure 3 farther from the substrate 2. To be noted, in other embodiments, the dense structure 4 may further mask other surfaces of the first mask structure 3.

The substrate 2 can be used as a protective plate of the electronic device, and the surface of the substrate 2 facing the user, i.e. the surface of the substrate 2 opposite to the first mask structure 3 and the dense structure 4, can be directly provided for the user's touch operation. The substrate 2 can be made of transparent material, such as glass, quartz, polyethyleneterephthalate (PET), polycarbonate (PC) or polymethylmethacrylate (PMMA). Herein, the substrate 2 is made of glass for example, and the thickness of the substrate 2 is about 0.6 mm to about 0.8 mm. The substrate 2 can be strengthened to become tempered glass for example, for enhanced hardness, but the material and the thickness thereof are not limited in this disclosure. In other embodiments, the surface of the substrate 2 provided for the user's touch operation is coated with various layers, such as an anti-fingerprint layer, an anti-glare layer or an anti-scratch layer, for enhancing the user experience.

The first mask structure 3 can be a single-layer or multi-layer structure, and the physical structure thereof will be illustrated hereinafter, so the related illustration is omitted here for conciseness. The material of the first mask structure 3 includes opaque non-black or light insulating material, such as non-black ink material or photoresist material (e.g. white, yellow, pink or green non-black ink or photoresist, material). When the first mask structure 3 is made of ink material, the method for forming the first mask structure 3 can include spin coating, bar coating, dip coating, roll coating, spray coating, gravure coating, ink jet printing, slot coating or blade coating. To be noted, the first mask structure 3 may be formed of other materials with the masking effect, except or in addition to the ink material. The first mask structure 3 is mainly used to cover the electronic elements which are disposed in the mask area 21 and on the side farther from user than the first mask structure 3. Since the electronic elements are not appropriate to be seen by the user, the user's viewing effect can be enhanced when the electronic elements are covered by the first mask structure 3. In the practical application, in addition to the masking function, the first mask structure 3 also can make the mask area 21 display different color effects so as to meet the design requirement of the product.

For the sake of different color effects, the first mask structure 3 can be made of the above-mentioned non-black or light-color insulating material, but the molecules of the said materials are more sensitive to the temperature and the environment, so the first mask structure 3 is easily changed in color by the environmental temperature, or the contact with oxygen, or the contact with chemical liquids. However, in some embodiments, the dense structure 4 is disposed on the surface of the first mask structure 3 farther from the substrate 2 to prevent the first mask structure 3, especially the surface of the first mask structure 3, from being changed in color.

The dense structure 4 is made of the highly dense and highly temperature-resistant material, and is usually a transparent layer. The material thereof is, for example, $SiO_2$, SiON, or the mixture of $SiO_2$ and $Nb_2O_5$. To be noted, the highly dense and highly temperature-resistant properties of the dense structure 4 are defined in comparison with the first mask structure 3, and the density of the dense structure 4 is higher than that of the first mask structure 3. Physically, the density of the dense structure 4 is greater than or equal to about 0.74, and the dense structure 4 can prevent the oxygen or chemical liquids from permeating the first mask structure 3 in the subsequent processes so as to avoid the color change of the first mask structure 3. The highly temperature-resistant property means that the dense structure 4 is not deteriorated by resisting the temperature. For example, when the first mask structure 3 is made of white ink, the dense structure 4 can be a $SiO_2$ layer. Because the $SiO_2$ layer has the highly dense property and the highly temperature-resistant property, contact between the surface of the white ink and the oxygen, chemical liquids or influence by temperature can be reduced or eliminated, so that the composition of the white ink is not deteriorated, and the first mask structure 3 can be prevented from being changed in color (e.g. yellowed). The dense structure 4 can be formed on the first mask structure 3 by the sputtering, the evaporation or other processes, and the thickness thereof can be about 40 nm to about 60 nm, favorably 45 nm to 55 nm, so as to block the oxygen, the chemical liquids and the effect of temperature and also achieve the thinness and lightness of the touch panel. Although the dense structure 4 in some embodiments is a single-layer structure, the dense structure 4 can be a double-layer or multi-layer structure in other embodiments, so as to further enhance the effect of preventing the first mask structure 3 from being changed in color.

Figure 2A:
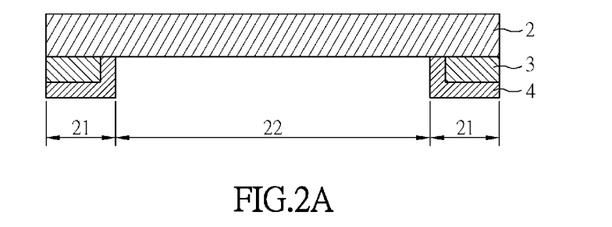
FIGS. 2A to 2C are schematic diagrams showing other embodiments of the touch panel of FIG. 1B.

FIGS. 2A to 2C are schematic diagrams showing other embodiments of the touch panel of FIG. 1B. At first, the difference between the touch panel shown in FIG. 2A and the touch panel shown in FIG. 1B is that the dense structure 4 of FIG. 2A further masks a lateral face of the first mask structure 3, especially the lateral face of the first mask structure 3 closer to the visible area 22. In detail, in addition to, masking the surface of the first mask structure 3 farther from the substrate 2 (such as the lower surface of the first mask structure 3 shown in FIG. 2A), the dense structure 4 is further extended to cover the surface of the substrate 2 from the lateral face of the first mask structure 3 closer to the visible area 22.

Figure 2B:
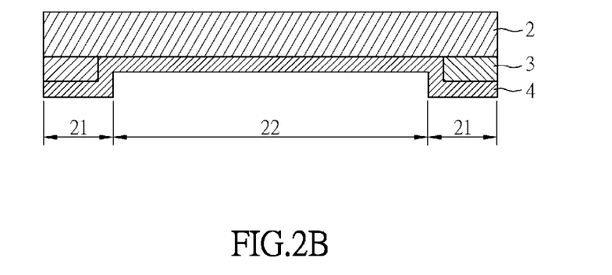

The difference between the touch panel shown in FIG. 2B and the touch panel shown in FIG. 2A is that the dense structure 4 of FIG. 2B further masks the visible area 22. That is, the dense structure 4 masks the surface of the first mask structure 3 farther from the substrate 2, the lateral face of the first mask structure 3 closer to the visible area 22 and the surface of the substrate 2 located in the visible area 22, so as to reduce the sectional height difference between the first mask structure 3 and the substrate 2 and further facilitate the disposition of other structures (such as the touch sensing structure described later) in the subsequent processes.

Figure 2C:
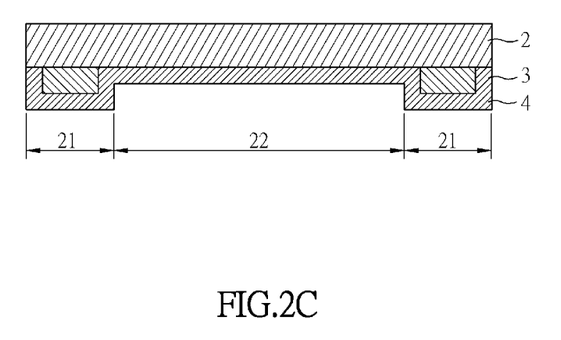

The difference between the touch panel shown in FIG. 2C and the touch panel shown in FIG. 2B is that the dense structure 4 of FIG. 2C further masks the lateral face of the first mask structure 3 farther from the visible area 22. In detail, the dense structure 4 not only masks the surface of the first mask structure 3 farther from the substrate 2, the lateral face of the first mask structure 3 closer to the visible area 22 and the surface of the substrate 2 located in the visible area 22, but also is extended to cover the surface of the substrate 2 from the lateral face of the first mask structure 3 farther from the visible area 22. In some embodiments shown in FIGS. 2A to 2C, the dense structure 4 more completely masks the surface and the lateral face of the first mask structure 3, so as to provide the protection for the all surfaces of the first mask structure 3 and enhance the effect of avoiding the occurrence of the color change. Because the dense structure 4 masks the visible area 22 in FIGS. 2B and 2C, the dense structure 4 is favorably made of transparent materials, such as the transparent $SiO_2$ material or other transparent materials with a high density, such as SiON or the mixture of $SiO_2$ and $Nb_2O_5$. However, this disclosure is not limited thereto.

Figure 3A:
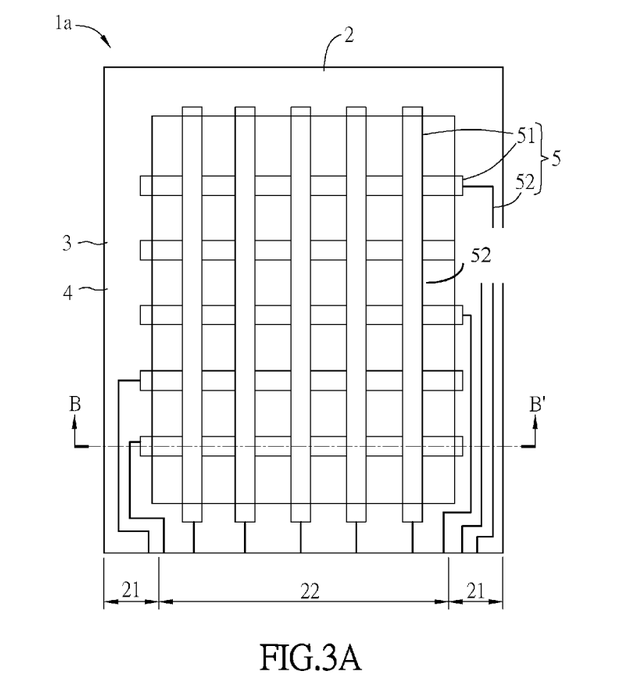
FIG. 3A is a schematic top-view diagram of a touch panel of the other embodiments of the disclosure.
Figure 3B:
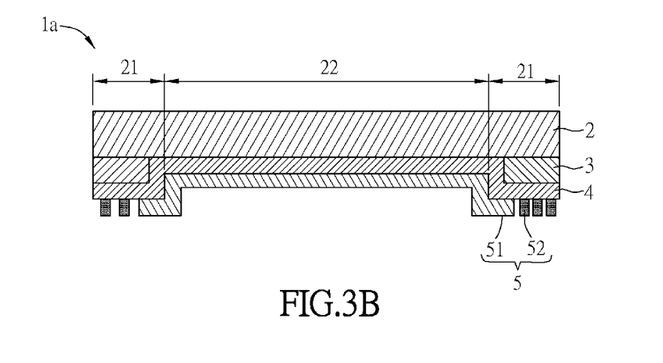
FIG. 3B is a schematic sectional diagram taken along the line B-B' in FIG. 3A.

FIG. 3A is a schematic top-view diagram of a touch panel 1a of some embodiments of the disclosure, and FIG. 3B is a schematic sectional diagram taken along the line B-B' in FIG. 3A. As shown in FIGS. 3A and 3B, the touch panel 1a of some embodiments is approximately the same as the above embodiments, and the difference between them is that the touch panel 1a further includes a touch sensing structure 5. To be noted, the relative positions of the substrate 2, the first mask structure 3 and the dense structure 4 are illustrated using the configuration of FIG. 2B as a non-limiting example.

In some embodiments, the touch sensing structure 5 includes an electrode structure 51 and a plurality of wires 52. The electrode structure 51 is disposed in the visible area 22 and is partially extended to the portion of the dense structure 4 located in the mask area 21. In some embodiments, the electrode structure 51 and the substrate 2 are respectively disposed on the opposite two sides of the dense structure 4. The conducting material is deposited by the sputter method or the chemical vapor deposition method and then patterned by the photolithography, so as to form the electrode structure 51 on the surface of the dense structure 4. The wires 52 are disposed on the dense structure 4 and electrically connected to the electrode structure 51. The wires 52 are disposed in the mask area 21, so that the wires are not seen by the user 52, and are covered by the first mask structure 3. The electrode structure 51 of some embodiments is given as an example to include the transverse electrodes and the longitudinal electrodes which intersect each other, but this disclosure is not limited thereto. The electrode structure 51 may just include uniaxial electrodes, and the pattern and the material thereof are also not limited, but the electrode structure 51 is favorably made of transparent conducting material. The transparent conducting material can be, for example, indium tin oxide (ITO), indium zinc oxide (IZO), cadmium tin oxide (CTO), aluminum zinc oxide (AZO), indium tin zinc oxide (ITZO), zinc oxide (ZnO), cadmium oxide (CdO), indium gallium zinc oxide (InGaZnO), indium gallium zinc magnesium oxide (InGaZnMgO), indium gallium magnesium oxide (InGaMgO) or indium gallium aluminum oxide (InGaAlO). The disposition of the wires 52 also can be adjusted according to practical requirements, and the material of the wires 52 can be, for example, gold, silver, copper, nickel, aluminum, chromium, any alloy thereof or any combination thereof.

Figure 4A:
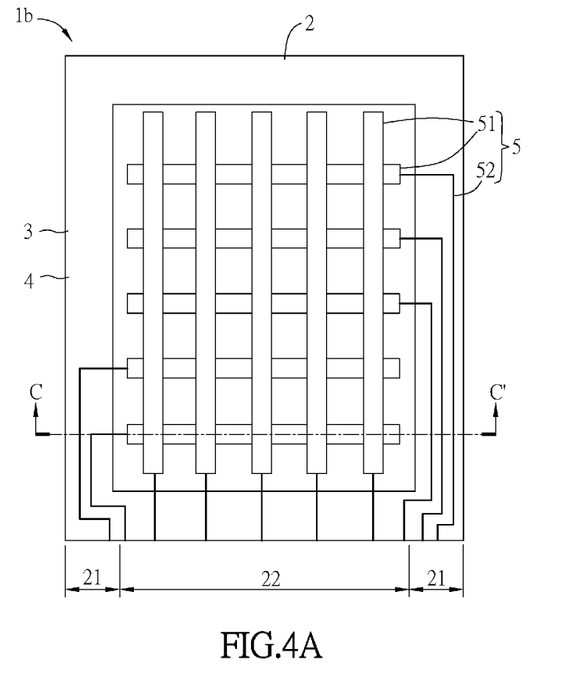
FIG. 4A is a schematic top-view diagram of a touch panel of the other embodiments of the disclosure.
Figure 4B:
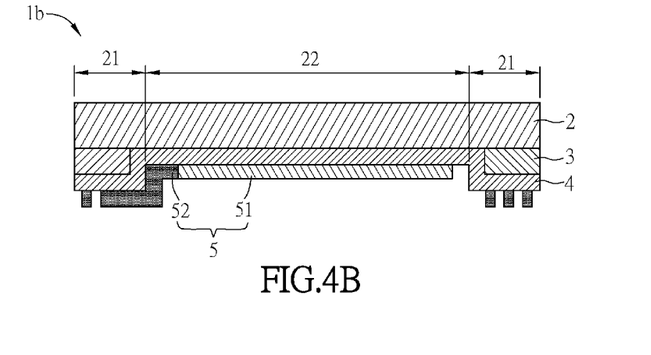
FIG. 4B is a schematic sectional diagram taken along the line C-C' in FIG. 4A.

In some embodiments, the material of the electrode structure 51 is ITO for example, and the thickness thereof is about 30 nm to about 50 nm. As shown in FIG. 3B, because the electrode structure 51 needs to climb to the mask area 21 from the location of the visible area 22, when the electrode structure 51 is made of material having higher brittleness (such as ITO) and a bigger sectional height difference exists between the portion of the dense structure 4 at the mask area 21 and the portion of the dense structure 4 at the visible area 22, the electrode structure 51 is likely to suffer breakage. FIG. 4A is a schematic top-view diagram of a touch panel 1b in accordance with other embodiments of the disclosure, and FIG. 4B is a schematic sectional diagram taken along the line C-C' in FIG. 4A. The difference from the embodiment of FIGS. 3A and 3B is that, in some embodiments, the electrode structure 51 is disposed within the visible area 22 and the wires 52 are disposed on the dense structure 4 and partially extended to the visible area 22 to be electrically connected with the electrode structure 51 disposed within the visible area 22. Because the electrode structure 51 need not climb in some embodiments, the breakage of the electrode structure 51 due to the climb can be avoided. Besides, the wires 52 are mostly made of metal material, the ductility thereof is better and the breakage problem is less likely to occur. Furthermore, at least the portion of the wires 52 disposed in the visible area 22 can be made of the low-reflectivity material or the transparent conducting material, so the problem of the wires being seen by human eyes can be reduced.

As shown in FIGS. 3B and 4B, because the dense structure 4 is formed after the first mask structure 3 and prior to the electrode structure 51 and also is disposed on the surface of the first mask structure 3 farther from the substrate 2, the first mask structure 3 can be protected and insulated by the dense structure 4 from the influence of the temperature, the oxygen or the chemical liquids in the process of forming the electrode structure 51 (such as the sputter process and the photolithography process), so that the problems of the deterioration and the color change of the first mask structure 3 can be avoided and the original color effect can be kept.

Figure 5:
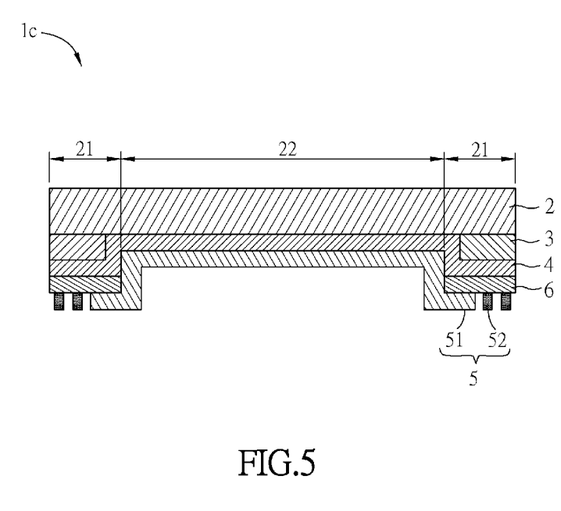
FIG. 5 is a schematic diagram of a touch panel of the other embodiments of the disclosure.

FIG. 5 is a schematic diagram of a touch panel 1c of another embodiment of the disclosure. The touch panel 1c of some embodiments is approximately the same as the above embodiments (the touch panel 1a in FIG. 3B), and the difference between them is that a second mask structure 6 in the touch panel 1c is further disposed between the dense structure 4 and the wires 52 and disposed correspondingly in the mask area 21. The material of the second mask structure 6 can be black photoresist material, black ink material, dark-color ink material or other dark-color materials. Herein for example, the material of the second mask structure 6 is black photoresist material. Because the second mask structure 6 is disposed in the mask area 21, the optical density (OD) of the mask area 21 can be further enhanced. Especially when the first mask structure 3 is made of the white ink material or other light-color materials, the second mask structure 6 can provide a better shelter for the visible elements (such as the wires 52) in the mask area 21.

Figure 6:
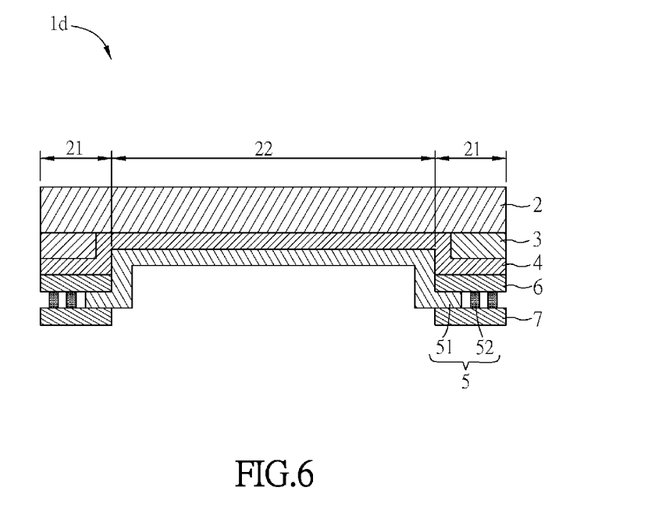
FIG. 6 is a schematic diagram of a touch panel of the other embodiments of the disclosure.

FIG. 6 is a schematic diagram of a touch panel 1d in accordance with other embodiments of the disclosure. The touch panel 1d of some embodiments is approximately the same as the above embodiments (the touch panel 1c of FIG. 5), and the difference between them is that the touch panel 1d further includes a protection layer 7, which is disposed on the side of the touch sensing structure 5 farther from the second mask structure 6 and is disposed in the mask area 21 and at least masks the wires 52 and the second mask structure 6. The material of the protection layer 7 can be black photoresist material, black ink material, dark-color ink material or other dark-color materials. Herein, the material of the protection layer 7 is black photoresist material for example. The protection layer 7 can protect the wires 52 and the second mask structure 6 from the scratch. Moreover, when the touch panel 1d and another display panel are integrated into a touch display apparatus, the protection layer 7 can also prevent the light leakage in the mask area 21 from being seen by the user when the user views the displayed image from an oblique direction.

The above embodiments are mainly for the illustration of the whole structure of the touch panel. In some embodiments of this disclosure, the first mask structure 3 also can be designed variously, and some examples thereof will be illustrated as below. FIGS. 7A, 7B, 7C and 7D are schematic diagrams of the first mask structure 3 in accordance with various embodiments of the disclosure.

Figure 7A:
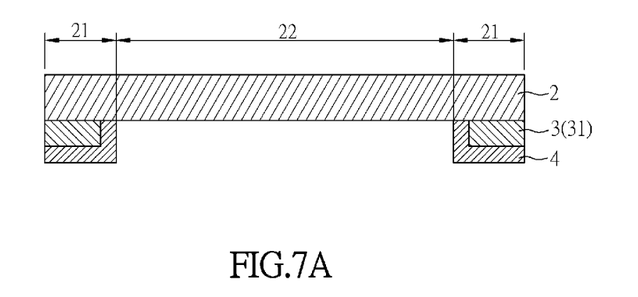
FIGS. 7A, 7B, 7C and 7D are schematic diagrams of the first mask structure of different embodiments of the disclosure.

As shown in FIG. 7A, the first mask structure 3 includes a first mask layer 31, which is disposed on the substrate 2 and between the dense structure 4 and the substrate 2. In other words, the first mask structure 3 of some embodiments is a single-layer mask structure, such as the white ink of a single layer.

Figure 7B:
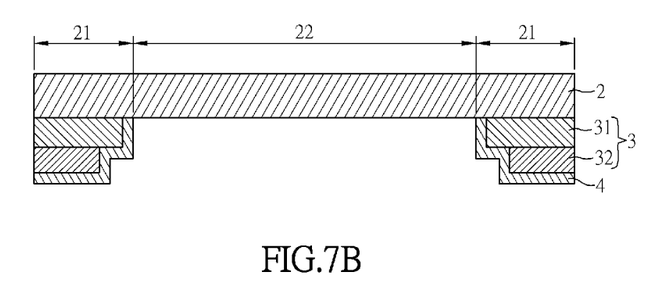

As shown in FIG. 7B, the difference between the embodiments of FIGS. 7A and 7B is that the first mask structure 3 is a double-layer mask structure, which means the first mask structure 3 includes a first mask layer 31 and a second mask layer 32. The materials of the first mask layer 31 and the second mask layer 32 can be white ink material, yellow ink material, the ink material of other colors or other light-color materials. The colors of the first mask layer 31 and the second mask layer 32 can be the same or different. The first mask layer 31 is disposed on the substrate 2, and the second mask layer 32 is disposed on the first mask layer 31 and between the dense structure 4 and the first mask layer 31.

To be noted, the areas of the second mask layer 32 and the first mask layer 31 can be the same or different. As shown in FIG. 7B, the area of the second mask layer 32 is less than that of the first mask layer 31. Besides, the second mask layer 32 is disposed, farther from the visible area 22, on the first mask layer 31, and the ends of the second mask layer 32 and the first mask layer 31 closer to the visible area 22 form a stair-like structure. The stair-like first mask structure 3 reduces the sectional height difference between the first mask structure 3 and the substrate 2, and the disposition of the above-mentioned electrode structure 51 (as shown in FIG. 6) can be more benefited as a result. Besides, the technical accuracy requirement can also be reduced. For example, accurately controlling the printing tolerance of the first mask layer 31 reduces the accuracy requirement of the second mask layer 32 as long as the second mask layer 32 does not exceed the edge of the first mask layer 31.

Figure 7C:
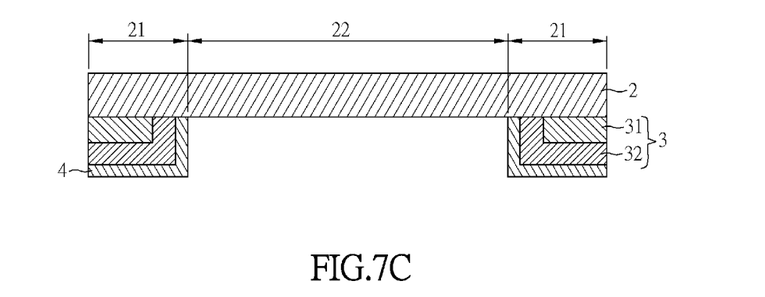

The area of the second mask layer 32 can also be larger than that of the first mask layer 31, as shown in FIG. 7C. The second mask layer 32 is extended to the substrate 2 along the lateral face of the first mask layer 31 closer to the visible area 22. That is, the second mask layer 32 masks the upper surface of the first mask layer 31 and the lateral face of the first mask layer 31 closer to the visible area 22, so that the thickness of the whole first mask structure 3 can be more even and the appearance effect can be better.

Figure 7D:
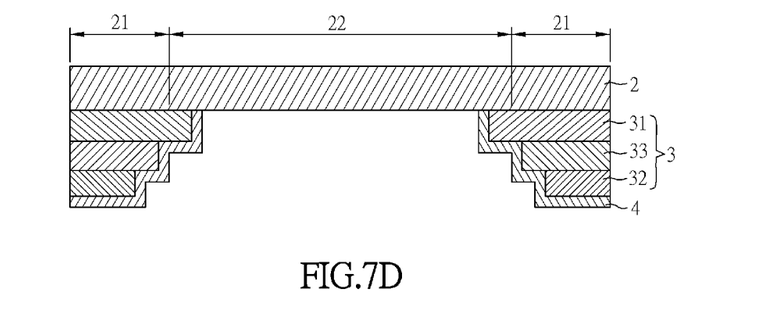

Moreover, at least a third mask layer 33 can be disposed between the first mask layer 31 and the second mask layer 32 of the first mask structure 3 so as to form a multi-layer structure. The material of the third mask layer 33 can be white ink material, yellow ink material, the ink material of other colors or other light-color materials. By forming the first mask structure 3 as a multi-layer structure, the optical density of the first mask structure 3 can be increased. Especially when the first mask structure 3 is made of white or other light-color ink materials, the multi-layer structure can provide a better shelter effect. Herein for example, the first mask structure 3 includes three ink layers as shown in FIG. 7D. In other embodiments, the first mask structure 3 also may include four or more ink layers, so as to satisfy the different requirements of the product.

Summarily, in the touch panel of this disclosure, the dense structure masks the first mask structure and has a higher density and a capability to resist the high temperature. Therefore, the first mask structure is protected, so that the first mask structure in the mask area can be prevented from being influenced by the temperature, the oxygen or the chemical liquid and the deterioration and the color change can be avoided. Thereby, the appearance of the touch panel is improved.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A touch panel, comprising:
    a substrate;
    a first mask structure disposed on a surface of the substrate and dividing the substrate into a mask area and a visible area disposed adjacent to the mask area, wherein the first mask structure is disposed in the mask area;
    a dense structure at least masking a surface of the first mask structure farther from the substrate;
    a touch sensing structure, comprising:
        an electrode structure disposed on a surface of the dense structure in the visible area; and
        a plurality of wires disposed on the dense structure in the mask area, partially extended to the surface of the dense structure in the visible area, and electrically connected with the electrode structure;
    a second mask structure disposed between the dense structure and the plurality of wires and located in the mask area; and a protection layer disposed on a side of the touch sensing structure farther from the second mask structure and located in the mask area, wherein:
the protection layer at least masks the plurality of wires and the second mask structure,
the second mask structure and the protection layer comprise black ink material or black photoresist material,
the first mask structure comprises a first mask layer and a second mask layer,
the first mask layer is disposed on the substrate,
the second mask layer is disposed on an upper surface of the first mask layer and between the dense structure and the first mask layer,
the second mask layer overlaps all of the upper surface of the first mask layer,
an area of the first mask layer is less than an area of the second mask layer, and
the second mask layer is extended to the substrate along a lateral face of the first mask layer closer to the visible area.

2. The touch panel as recited in claim 1, wherein the dense structure further masks a lateral face of the first mask structure closer to the visible area.

3. The touch panel as recited in claim 2, wherein the dense structure is extended to the surface of the substrate in the visible area along the lateral face of the first mask structure closer to the visible area.

4. The touch panel as recited in claim 1, wherein the dense structure further masks a lateral face of the first mask structure farther from the visible area.

5. The touch panel as recited in claim 1, wherein the dense structure is made of a transparent insulating material.

6. The touch panel as recited in claim 1, wherein the first mask structure comprises an opaque non-black insulating material.

7. The touch panel as recited in claim 1, wherein the first mask structure comprises a white ink material.

8. The touch panel as recited in claim 1, wherein a dense degree of the dense structure is larger than or equal to 0.74.

9. The touch panel as recited in claim 1, wherein the dense structure is a transparent layer.

10. The touch panel as recited in claim 9, wherein dense structure comprises transparent $SiO_2$, SiON, or a mixture of $SiO_2$ and $Nb_2O_5$.

* * * * *